UNITED STATES PATENT OFFICE.

MAX BUCHNER, OF MANNHEIM, GERMANY, ASSIGNOR TO C. F. BOEHRINGER & SOEHNE, OF MANNHEIM-WALDHOF, GERMANY.

PROCESS OF CHLORINATING.

1,129,165.  Specification of Letters Patent.  Patented Feb. 23, 1915.

No Drawing.  Application filed November 13, 1911.  Serial No. 660,348.

*To all whom it may concern:*

Be known that I, MAX BUCHNER, citizen of Germany, residing at Prinzwilhelmstrasse 6, Mannheim, Germany, have invented certain new and useful Improvements in Processes of Chlorinating; and I do hereby declare the following to be a full, clear, and exact description of the invention, such as will enable others skilled in the art to which it appertains to make and use the same.

My invention relates to an improved process for the chlorination of oleaginous materials such as oils and fats, the oils being either the ordinary oils or petroleum products. Consistent oleaginous materials, such as paraffin and other waxes, and even resinous bodies, may be treated.

My invention, broadly considered, consists in carrying out the chlorination of such material in the presence of carbon tetrachlorid to produce highly chlorinated substances. This may be done either at normal or at higher temperatures and at any desired pressure, as for example at atmospheric pressure or higher.

Many attempts have been made heretofore to chlorinate oils, fats, resins and paraffins by heating these bodies and then leading chlorin into contact with them, or by treating them with chlorin in the presence of an alkali, or by heating them with aluminum chlorid, but none of these processes so far as known to me have been entirely satisfactory. For example, the first mentioned process gives strongly colored, badly colored, smeary or very sticky products, which properties injuriously affect the utility of such products. Furthermore, chlorinated paraffin obtained in this way is a dough-like product strongly impregnated with hydro-chloric acid, which can be driven off completely from the doughy product only with the greatest difficulty.

By the method of chlorination in the presence of alkali or by the use of aluminum chlorid, the chlorination action lags behind an action of oxidation and condensation which also forms a part of the reaction.

All the above-mentioned prior methods of chlorination have the common disadvantage that they give products with a restricted content of chlorin, that is to say the chlorination of the material being treated cannot be pushed beyond a certain limit. By my process, on the contrary, there can be obtained completely pure high-chlorinated products of a clear color, whose chlorin contents can be increased from any desired limit up to the highest possible content materially beyond that hitherto attainable by any prior processes of which I am aware. Furthermore, by my process the consistency is increased with such a decrease of the pastiness that highly chlorinated bodies may be produced which are completely solid at usual temperatures and do not show further any pasty substance. Many of these resulting products have a melting point about 100° to 115°.

It is to be noted that the carbon tetrachlorid in my improved process does not work merely as a solvent, but in fact also acts as a reaction accelerator. For example, by the introduction of chlorin into a solution of paraffin in carbon tetrachlorid, even at a temperature of 70° to 75° C., a product is produced with a chlorin content of 77%, while by the introduction of chlorin into paraffin, according to the methods heretofore proposed, the paraffin being heated to about 120° to 150° C., products are obtained containing only about 60% of chlorin. As at the said temperature of 120° to 150° C. the reaction mass is a very thin fluid, it is clear that the failure of the process to carry the chlorination above 60% cannot be due to any merely mechanical hindrance. By my process, furthermore, the incompletely chlorinated products obtained by the said prior processes may be still further chlorinated to completion. A further and very striking proof that the carbon tetrachlorid does not act in my process merely as a solvent is the fact that by my said process bodies which are only slightly soluble or in fact, practically insoluble in carbon tetrachlorid, such for example as copal resin, may be chlorinated in the presence of the carbon tetrachlorid to form compounds having a high chlorin content. This fact is the more unexpected because according to the teaching of the prior art it was supposed that the presence of hydro-chloric acid prevented the chlorination.

While in the presence of alkali copal resin takes up only 12% of chlorin, still by my process products having 35 to 56% of chlorin may be obtained from copal resin.

In carrying out my process the material to be treated is dissolved or suspended in carbon tetrachlorid, and chlorin is led into the solution or mixture until the product has received the desired amount. The temperature may be at normal or higher and the pressure may be atmospheric or above. The process of chlorination is favorably influenced by the action of direct sunlight or any artificial source of light containing chemically active rays.

The chlorinated products obtained by my process as above described may be employed as coating or impregnating materials, for varnishing, etc.

Having thus fully described my invention, what I claim is:

1. The process of chlorinating oleaginous material which comprises mixing the substances to be chlorinated with carbon tetrachlorid and introducing chlorin into the mixture.

2. The process of chlorinating oleaginous material which comprises mixing the substances to be chlorinated with carbon tetrachlorid and introducing chlorin into the mixture while heating the same.

3. The process of chlorinating oleaginous material which comprises mixing the substances to be chlorinated with carbon tetrachlorid and introducing chlorin into the mixture while subjecting the same to the action of chemically active light rays.

4. The process of chlorinating oleaginous material which comprises mixing the substances to be chlorinated with carbon tetrachlorid and introducing chlorin into the mixture while subjecting the same to the action of heat and of chemically active light rays.

5. The process of further chlorinating bodies previously chlorinated to a restricted amount, which consists in subjecting said bodies to the action of chlorin in the presence of carbon tetrachlorid.

In testimony whereof I hereunto affix my signature in the presence of two witnesses.

Dr. MAX BUCHNER.

Witnesses:
D. NAUEN,
WILLIAM C. TEICHMANN.